United States Patent [19]

Kempter et al.

[11] 4,260,697

[45] Apr. 7, 1981

[54] SURFACE-COATING BINDERS

[75] Inventors: Fritz E. Kempter, Mannheim; Heinrich Hartmann, Limbergerhof; Erich Gulbins, Heidelberg-Neuenheim, all of Fed. Rep. of Germany

[73] Assignee: BASF Aktiengesellschaft, Fed. Rep. of Germany

[21] Appl. No.: 932,466

[22] Filed: Aug. 10, 1978

Related U.S. Application Data

[63] Continuation of Ser. No. 739,797, Nov. 8, 1976, abandoned.

[30] Foreign Application Priority Data

Dec. 2, 1975 [DE] Fed. Rep. of Germany ....... 2554080

[51] Int. Cl.³ ............................................. C08L 63/00
[52] U.S. Cl. ..................................... 525/484; 525/512
[58] Field of Search ........... 260/831, 830 P, 29.2 TN; 525/484, 490, 512, 516

[56] References Cited

U.S. PATENT DOCUMENTS

| 3,947,338 | 3/1976 | Jerabek et al. | 260/29.2 TN |
| 3,994,989 | 11/1976 | Kempter et al. | 260/831 |
| 4,001,155 | 1/1977 | Kempter et al. | 260/831 |
| 4,086,292 | 4/1978 | Kempter et al. | 260/831 |

Primary Examiner—Lorenzo B. Hayes
Assistant Examiner—Amelia S. Yarbrough
Attorney, Agent, or Firm—Keil & Witherspoon

[57] ABSTRACT

Surface-coating binders based on a reaction product of Mannich bases, obtained from polyhydric phenols, secondary amines and formaldehyde, with epoxy resins. The Mannich bases and/or the epoxy resins carry hydroxyl groups, bonded to aliphatic structures, which have been converted to urethane groups by reaction with partially blocked polyisocyanates. When protonized and diluted with water, the surface-coating binders may be used as cationic electrocoatings.

18 Claims, No Drawings

SURFACE-COATING BINDERS

This is a continuation of application Ser. No. 739,797 filed Nov. 8, 1976, now abandoned.

The present invention relates to surface-coating binders based on reaction products of Mannich bases with epoxy resins, which carry urethane groups, and to their use, in a protonized form which can be diluted with water, as cationic binders for electrocoatings.

A number of cationic binder systems for electrocoatings, which contain urethane groups, amine groups and, at times, hydroxyl groups, have been disclosed.

These coatings show good results, inter alia, in respect of corrosion protection, throwing power or stability of the coating bath, but are not fully satisfactory as regards the totality of properties of the binders. An essential shortcoming of the conventional systems is, inter alia, that they cannot be processed in the pH range of from 7 to 9 which is employed in anodic electrocoating. A further disadvantage is that the crosslinking reactions cited are in some cases inappropriate for the desired pH range.

Cationic electrocoating binders, which inter alia exhibit very good corrosion protection, and which can be deposited at an alkaline pH, above 7, have also been disclosed. These are reaction products of Mannich bases obtained from condensed phenols, secondary amines and formaldehyde, with epoxy resins. Essentially, the diethanolaminomethylene group or the alkylethanolaminomethylene group of the Mannich base is responsible for the crosslinking occurring on baking the coatings. A disadvantage of these systems is that amines, especially dialkylamines, are eliminated on baking.

It is an object of the present invention to provide cationic electrocoating binders which substantially meet the required standards in respect of the essential binder properties. In particular, it is an object of the invention to provide binders which eliminate little or no amine on baking. The pH of the coating baths should be from 7 to 9, since they must have a pH above 7 to be usable in the conventional processing installations.

We have found that these objects are achieved by providing surface-coating binders which are substantially free from epoxide groups and which are obtained by reaction of (A) from 25 to 90 percent by weight of Mannich bases obtained from (a₁) polyhydric phenols which contain two or more aromatic rings and are free from ether groups and/or (a₂) monohydric or polyhydric phenols which contain two or more aromatic rings and contain ether groups, (b₁) secondary amines which contain one or two hydroxyalkyl groups, mixed with (b₂) secondary dialkylamines or dialkoxyalkylamines and (c) formaldehyde or formaldehyde donor compounds, and (B) from 75 to 10 percent by weight of epoxy resins, and in which at least a part of the Mannich base (A) and/or of the epoxy resin (B) carries hydroxyl groups which are bonded to aliphatic structures and which have been converted to urethane groups by reaction with partially blocked polyisocyanates.

The Mannich bases (A) are manufactured from (a) condensed phenols, (b) secondary amines and (c) formaldehyde.

(a) Suitable condensed phenols (a₁) are polyhydric phenols which contain at least two aromatic rings and are free from ether groups; particularly suitable phenols are those of the general formula

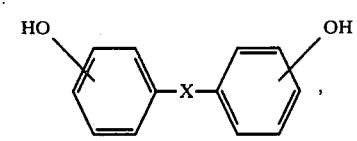

where the hydroxyl groups are in the ortho-position or para-position to X and X is a straight-chain or branched, divalent aliphatic radical of 1 to 3 carbon atoms or is

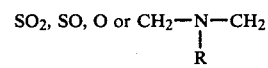

where R is alkyl of 1 to 6 carbon atoms). Bisphenol A is used preferentially. Low molecular weight reaction products of phenols with formaldehyde, i.e. novolacs, may also be employed.

Where appropriate, further condensed phenols (a₂), which contain at least one phenolic hydroxyl group and in addition contain one or more ether groups in the molecule, may be used mixed with the condensed phenols (a₁), or in place of the latter. These phenols (a₂) have the general formula

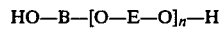

or

where B is

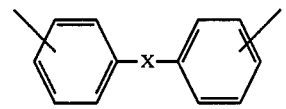

and X has the above meanings, E is a radical, containing hydroxyl groups, obtained by addition of an epoxy compound to a phenolic hydroxyl group, P is phenyl or alkylphenyl, and n is an integer from 1 to 3, preferably epoxy compounds (for E) being epoxy resins, e.g. the diglycidyl ethers of bisphenol A, pentaerythritol, glycerol, trimethylolpropane, glycol, glycol ethers and other polyhydric, preferably dihydric to tetrahydric, aliphatic alcohols.

If the condensed phenols (a₂) are to be employed alone, those based on triglycidyl ethers or tetraglycidyl ethers are preferred.

Other suitable compounds containing epoxide groups are nitrogen-containing diepoxides, such as are described in U.S. Pat. No. 3,365,471, epoxy resins obtained from 1,1-methylene-bis-(5-substituted hydantoin) as described in U.S. Pat. No. 3,391,097, diepoxides obtained from bis-imides, are described in U.S. Pat. No. 3,450,711, epoxylated aminomethyl-diphenyl oxides as described in U.S. Pat. No. 3,312,664, heterocyclic N,N'-diglycidyl compounds as described in U.S. Pat. No.

3,503,979, aminoepoxyphosphates as described in British Pat. No. 1,172,916 or 1,3,5-triglycidylisocyanurates.

Particularly preferred components (a₂) are reaction products of diglycidyl ethers of bisphenol A or of polyhydric aliphatic alcohols, e.g. pentaerythritol, trimethylolpropane and glycerol, with bisphenol A and, if appropriate, phenol. Such products in general have molecular weights of from 650 to 1,300 and epoxide values of from 0.004 to 0.01 and may be produced, for example, at from 160° to 180° C. or, if reaction catalysts are present, at appropriately lower temperatures.

The condensed phenols (a₂) contain hydroxyl groups bonded to aliphatic structures. In part these result from the epoxide groups of the epoxy resins (E) when the latter are reacted with the bisphenols (B) or with the phenols (P). However, hydroxyl groups can also be present in the actual epoxy resins if these have been produced by reacting alcohols having more than two OH groups (e.g. pentaerythritol, trimethylolpropane or glycerol) with 2 moles of epichlorohydrin.

In the inherently preferred case where mixtures of the components (a₁) and (a₂) are employed, the weight ratio of the two components is from 1:0.1 to 1:5.

(b) Examples of suitable secondary amines (b₁) which contain at least one hydroxyalkyl group are alkylethanolamines or alkylisopropanolamines, where alkyl is of 1 to 6 carbon atoms. However, dialkanolamines of alcohols of 2 to 6 carbon atoms, especially diethanolamine and mixtures of these dialkanolamines with alkylalkanolamines are preferred.

The secondary amines (b₁) which become incorporated into the Mannich bases (A) as dialkanolaminomethyl groups and alkylalkanolaminomethyl groups, are of essential importance in determining the degree of dispersibility of the binders in the desired pH range of from 6.0 to 10.2, and in determining the crosslinking of the system.

Suitable secondary alkylamines (b₂) which are employed together with the amines (b₁), which contain hydroxylalkyl groups, to manufacture the Mannich bases are those of the general formula

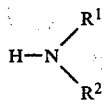

where $R^1$ and $R^2$ are identical or different and are a straight-chain or branched aliphatic radical of 2 to 10 carbon atoms, which may or may not contain alkoxy groups. Examples of suitable secondary amines of this type are di-n-butylamine, di-n-propylamine, diisopropylamine, di-n-pentylamine, di-n-hexylamine, di-n-octylamine, di-2-ethylhexylamine and di-2-alkoxyethylamines, e.g. di-2-methoxy-, di-2-ethoxy- or di-2-butoxyethylamine, and amines in which $R^1$ and $R^2$ are linked to form a ring, e.g. morpholine or piperidine.

Di-n-butylamine, di-2-ethylhexylamine and di-n-hexylamine are preferred. The mode of action of the secondary amines (b₂) is principally that they influence the stability of the binders; in addition they contribute to the levelling and internal plasticization of the coatings produced from the binders. They also made some contribution to the crosslinking reaction. On the other hand, however, they are rather evil-smelling substances which cause an objectionable odor even if only small amounts are liberated when baking the coating.

The secondary amines can inter alia also contain a proportion of corresponding primary amines, as a result of their method of manufacture, but the proportion of the latter should not exceed 20 percent by weight of the secondary amine. The weight ratio of components (b₁) and (b₂) may be from 1:10 to 1:0.1, preferably from 1:2 to 2:1.

(c) Solutions of formaldehyde in water or alcohols, e.g. butanol, or paraformaldehyde, or mixtures of these, are used as the formaldehyde or formaldehyde donor compounds (c).

The Mannich bases (A) are manufactured by the conventional methods disclosed in the literature (cf., e.g., Houben-Weyl, Methoden der organischen Chemie, volume XI/1, page 731 (1957)), preferably by reaction at from 20° to 80° C. The ratios of the starting materials employed depend on the properties desired in each particular case, the preferred molar ratio of component (a) to component (b) being from 1:0.75 to 1:3. In general, however, about one mole of secondary amine (b) is employed per phenolic hydroxyl group. The amount of (c) is at least one mole per mole of (b).

Preferred epoxy resins (B) are polyepoxy compounds with 2 to 3 epoxide groups in the molecule, e.g. reaction products of polyhydric phenols, especially those of the formula given under (a₁)

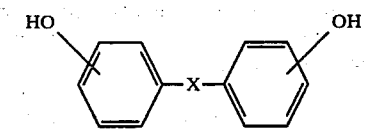

with epichlorohydrin, but also the abovementioned reaction products of polyhydric alcohols, e.g. pentaerythritol, trimethylolpropane or glycerol, with epichlorohydrin, and furthermore reaction products, containing epoxide groups, of epoxy resins with secondary amines or glycol ethers containing hydroxyl groups, we well as epoxy resins which contain hetero-atoms, e.g. sulfur.

In general, the epoxy resins (B) also contain hydroxyl groups bonded to aliphatic structures, especially if a condensation reaction, to give products of higher molecular weight, has occurred during the reaction of the polyhydric alcohol.

The reaction of the component (A) with the component (B) is in general carried out at from 20° to 100° C., preferably from 40° to 80° C., preferentially in the presence of organic solvents, e.g. alcohols or glycol ethers.

It can be assumed that the principal reaction which occurs when reacting the Mannich base (A) with the epoxy resins (B) is an auto-catalyzed etherification of the phenolic hydroxyl groups by the epoxide groups.

It is essential that the reaction product obtained from components (A) and (B) should be substantially free from epoxide groups, i.e. contains not more than 0.3, and preferably less than 0.1, epoxide group per molecule of the reaction product. Advantageously, the components are reacted under conditions such as to provide from 0.2 to 0.9, preferably from 0.3 to 0.7, epoxide group of component (B) per phenolic hydroxyl group of component (A). If an excess of the epoxide groups of component (B) is present, these excess groups can be eliminated, at any desired stage, by suitable reactions, e.g. with acids, amines or, preferably, mercaptans, e.g. mercaptoethanol or dodecylmercaptan.

The essential feature of the invention is that at least a part of the Mannich bases (A) and/or of the epoxy resins (B) carries hydroxyl groups which are bonded to aliphatic structures and have been converted to urethane groups. The nature and origin of the hydroxyl groups have already been discussed. The reaction of the hydroxyl groups with the partially blocked polyisocyanates can be carried out at any desired stage of the manufacture of the binders; preferably, the reaction is carried out with the epoxy resins. The latter may be either the epoxy resins which constitute the component (B), or the epoxy resins (E) which are employed to manufacture the component ($a_2$). It is also possible to react the finished component ($a_2$) directly with the partially blocked polyisocyanate. If epoxy resins based on polyhydric aliphatic alcohols, e.g. pentaerythritol, are used, the isocyanate preferably attacks the free primary alcohol group and only as a second stage does the secondary alcohol group, which has been formed from the epoxide ring, undergo reaction. Phenolic hydroxyl groups essentially remain unattacked under the conditions chosen. Any amino or imino groups which may be present can also react with the partially blocked polyisocyanates, and this may be desirable in some cases.

The reaction is usually carried out at from 50° to 120°, preferably from 70° to 100° C., and conventional catalysts for polyurethane formation, e.g. dibutyl tin dilaurate, may be present. The reaction is carried out in the absence of polar solvents, preferably in the melt, though inert diluents may also be present.

Particularly suitable partially blocked polyisocyanates are aromatic diisocyanates, e.g. toluylene diisocyanates or xylylene diisocyanates or their dimers and trimers. However, aliphatic diisocyanates, e.g. hexamethylene diisocyanate, can also be used, as can prepolymers which are manufactured by reacting polyols or polyether polyols with an excess of polyisocyanates. Preferred blocking agents are aliphatic alcohols, which may be straight-chain, branched or cyclic, e.g. methanol, ethanol, n-, iso- or tert.-butanol, hexanol, ethylhexanol, furfuryl alcohol, cyclohexanol, alkylglycols, alkyldiglycols and alkyltriglycols. However, other conventional blocking agents, e.g. oximes, lactams, ketones or malonic acid esters, may also be used. The blocked isocyanate groups are stable to amino groups, and especially to hydroxyl groups, at room temperature and even at slightly elevated temperatures, and only react above 100° C.; at the baking temperatures, the replacement of the blocking agent by amines, which are in particular eliminated during curing, should take place rapidly and as completely as possible.

Though it is preferred to introduce the urethane groups into the epoxy resins or into the component ($a_2$), it is in principle also possible to start from the Mannich bases or even from the finished resin. In that case, however, the polar solvents which are in general introduced through the process of manufacture must beforehand be removed.

It is readily possible only to modify a part of the Mannich bases A or of the epoxy resins B with polyisocyanates, either by having epoxy compounds with and without aliphatic hydroxyl groups present alongside one another or by carrying out the reaction with the polyisocyanate and then adding further, unmodified, epoxy compounds.

The proportions chosen for the reaction with the partially blocked polyisocyanates are preferably such as to provide from 0.01 to 1.0, preferably from 0.05 to 0.5, mole of urethane groups per mole of basic nitrogen in the finished binder, the urethane groups including both the urethane bond between the binder and the polyisocyanate and the urethane bond between the blocking agent and the polyisocyanate. For example, in a binder containing from 1.5 to 4.5% of nitrogen, modification with from 3 to 15% of toluylene diisocyanate, based on solids, suffices substantially to suppress the elimination of amines during baking. The surface-coating binders of the invention can be diluted with conventional solvents for finishes, e.g. isopropanol or decanol, or with aqueous organic solvents, and can then be applied—with or without pigments, fillers and the conventional assistants—using conventional methods of coating, e.g. spraying, dipping or flooding, onto the substrate to be finished, e.g. wood, metal, glass or ceramic, after which they are dried and cured at about 170° C. The coatings thus obtained are distinguished by great hardness and solvent resistance.

Preferably, however, the surface-coating binders are protonized with acids, e.g. phosphoric acid and their derivatives or, preferably, with water-soluble carboxylic acids, e.g. acetic acid, formic acid or lactic acid. The protonized surface-coating binder can be diluted with water and can be processed using conventional coating methods, again giving coatings having valuable properties. The degree of protonization should be kept as low as possible.

However, the preferred use of the protonized surface-coating binders is the cathodic electrocoating of electrically conductive surfaces, e.g. of metal objects, e.g. sheets of brass, copper, aluminum, iron or steel, which may or may not be chemically pretreated, e.g. phosphatized.

The aqueous solutions or dispersions of the surface-coating binders, which binders are at least partially in the form of a salt of a water-soluble carboxylic acid, may additionally contain other assistants which can be cathodically deposited, e.g. other binders, pigments, extenders, soluble dyes, solvents, flow modifiers, stabilizers, curing catalysts or anti-foam agents.

For cathodic electrocoating, the solid content is generally brought to from 5 to 20 percent by weight by dilution with deionized water. The coating is deposited at from 15° to 40° C. over a period of from 1 to 2 minutes at a bath pH of from 6.5 to 10.2, preferably from 7.0 to 9.0, and at a deposition potential of from 50 to 500 volt. The film which has been cathodically deposited on the electrically conductive body is rinsed and then cured at from about 160° to 220° C. for from 10 to 30 minutes, preferably at from 170° to 200° C. for 20 minutes.

The crosslinking of the binders during baking essentially takes place via the alkanolaminomethyl group, though the dialkylaminomethyl group probably also participates; the blocked isocyanate groups in general contribute little to the crosslinking. Rather, they trap amines liberated during baking, by a nucleophilic exchange between the amine and the blocking agent. In the course of this exchange, the blocking agent, i.e. preferably a lower aliphatic alcohol, which causes substantially less contamination of the environment, is liberated. To a lesser degree, the amine may at the same time attack the urethane bond between the polyisocyanate and the binder, in which case a diurea compound is eliminated.

The coating agents of the invention, when applied to the substrate, produce coatings having good mechanical properties. In particular, they exhibit great hardness and scratch resistance coupled with good elasticity and firm adhesion. The coatings also exhibit high resistance to solvents and particularly high resistance in the salt spray test.

In the Examples, parts and percentages are by weight.

EXAMPLES

A. Reaction of the polyhydric phenol $a_2$, containing ether groups, with the partially blocked polyisocyanate:

985 parts of bisphenol A, 118.5 parts of phenol and 1,050 parts of the diglycidyl ether obtained from pentaerythritol and epichlorohydrin (epoxide value about 0.57) are reacted for 2 hours at 180° C., after which the mixture is diluted with 550 parts of toluene and cooled to 80° C.

300 parts of a half-blocked toluylene diisocyar to (obtained from 174 parts of toluylene diisocyanate and 130 parts of 2-ethylhexanol) are added dropwise to 375 parts of this product at 80° C. The mixture is then stirred for 1 hour at 120° C.; finally, the solids content is brought to 70.5% with 185 parts of iso-butanol.

B. Reaction of the epoxy resin B, with the partially blocked polyisocyanate:

1. 262.5 parts of the diglycidyl ether of pentaerythritol are added slowly to 300 parts of toluylene diisocyanate which is half-blocked with 2-ethylhexanol, and the mixture is allowed to react for 4 hours at 80° C. The dark yellow, viscous product is diluted to a solids content of 80% with iso-butanol. It has an epoxide value of 0.21.

2. Following the method described under 1, 262.5 parts of the diglycidyl ether of pentaerythritol are reacted with 248 parts of a half-blocked diisocyanate (obtained from 174 parts of toluylene diisocyanate and 74 parts of n-butanol) and the product is brought to a solids content of 80%. The epoxide value is 0.29.

C. Manufacture of the surface-coating binder;

1. 130 parts of diethanolamine ($b_1$), 105.6 parts of di-n-butylamine ($b_2$), 187.5 parts of bisphenol A ($a_1$), 340 parts of the product, containing urethane groups, obtained in Example A ($a_2$) and 69 parts of paraformaldehyde (c) in 163 parts of iso-butanol are reacted under nitrogen for 3 hours at 70° C. This results in the Mannich base (A).

157 parts of the diglycidyl ether obtained from bisphenol A and epichlorohydrin (epoxide value 0.2) (B) and 80 parts of the diglycidyl ether of pentaerythritol (epoxide value 0.57) (B) are then added and the mixture is reacted for 5 hours at 70° C. The binder has a solids content of 68%.

2. 136.8 parts of diethanolamine ($b_1$), 113 parts of di-n-butylamine ($b_2$), 69 parts of paraformaldehyde (c) and 197.3 parts of bisphenol A ($a_1$) in 105 parts of iso-propanol and 79 parts of iso-butanol are reacted under nitrogen for 3 hours at 80° C. 272 parts of the product from Example B.1 (B, containing urethane groups) and 180 parts of the diglycidyl ether of bisphenol A (B, free from urethane groups) in 100 parts of isobutanol are added to the resulting Mannich Base (A) and the mixture is reacted for 5 hours at 70° C. The solids content is 68.5%.

3. A binder having a solids content of 69% is produced by following the method described in Example C.2, but using 300 parts of the component B, containing urethane groups, from Example B.2 (instead of B.1).

4. Comparative Example:

The procedure followed is as described in Example C.1, except that instead of the product, containing urethane groups, from Example A, the equivalent amount of the same component $a_2$, but without urethane modification, is employed.

D. Electrocoating:

To prepare 10% strength coating baths, 0.4 l of the binders from Examples C are protonized with 1.25% strength acetic acid and then made up to 4 with fully desalinated water.

Steel sheets were cathodically coated in these baths, once immediately after their preparation and once after 13 days' aging at 30° C., the coating being carried out at 100 V and 350 V. The coating thickness was from 10 to 15 μm. The coating was then baked in a closed oven at 190° C. for 20 minutes. To examine the elimination of amine, the door of the oven was briefly opened during baking, and the intensity of the amine odor was assessed:

Rating 0: no odor
Rating 1: slight odor
Rating 2: distinct odor
Rating 3: powerful odor The results are shown in the Table.

TABLE

| Binder from Example | pH immediate | pH after 13 days | Conductivity (Siemens . cm$^{-1}$) immediate | Conductivity (Siemens . cm$^{-1}$) after 13 days | Nitrogen content | TDI added | Elimination of amine immediate | Elimination of amine after 13 days |
|---|---|---|---|---|---|---|---|---|
| C1 | 8.4 | 8.6 | 0.81 × 10$^{-3}$ | 0.78 × 10$^{-3}$ | 3.43% | 3.5% | 1 | 2 |
| C2 | 8.3 | 8.6 | 0.68 × 10$^{-3}$ | 0.68 × 10$^{-3}$ | 3.55% | 7.7% | 1 | 2 |
| C3 | 8.0 | 8.4 | 0.87 × 10$^{-3}$ | 0.62 × 10$^{-3}$ | 3.35% | 8.9% | 1 | 1 |
| C4 (Comparative Example) | 8.2 | 8.4 | 0.82 × 10$^{-3}$ | 0.80 × 10$^{-3}$ | 3.43% | — | 3 | 3 |

We claim:

1. A surface-coating binder which is substantially free from epoxide groups and water-dilutable by protonization with acids, said binder being a reaction product of
(A) from 25 to 90 percent by weight of a Mannich base obtained from
  ($a_1$) a polyhydric phenol which contains two or more aromatic rings and is free from ether groups, and which can be partially replaced by
  ($a_2$) a monohydric or polyhydric phenol which contains two or more aromatic rings and contains an ether group,
  ($b_1$) a secondary amine which contains one or two hydroxy alkyl groups, mixed with
  ($b_2$) a secondary dialkylamine or dialkoxyalkylamine and
  (c) formaldehyde or a formaldehyde donor, the amount of (c) is at least one mole per mole of ($b_1 + b_2$), and (B) from 75 to 10 percent by weight of an epoxy resin, wherein (a₁) is a phenol of the general formula

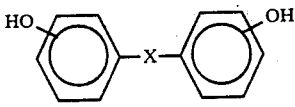

where X is a straight-chain or branched, divalent aliphatic radical of 1 to 3 carbon atoms or is $SO_2$, SO, O or $CH_2-NR-CH_2$ (where R is alkyl of 1 to 6 carbon atoms) and (a₂) is at least one further condensed phenol, which contains at least one phenolic hydroxyl group and in addition one or more ether groups in the molecule, having the general formula $$HO-B-[O-E-O]_n-H$$

or $$HO-B-[O-E-O]_n-P$$

where B is

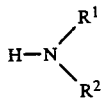

and X has the above meanings, E is a radical, containing hydroxyl groups, obtained by addition of an epoxy compound to a phenolic hydroxyl group, P is phenyl or alkylphenyl, and n is an integer from 1 to 3, (b₁) is a dialkanolamine of alcohols of 2 to 6 carbon atoms, (b₂) is a secondary dialkylamine having the general formula

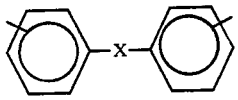

where $R^1$ and $R^2$ are identical or different and are a straight-chain or branched aliphatic radical of 2 to 10 carbon atoms, which may or may not contain alkoxy groups, the weight ratio of components (b₁) and (b₂) being from 1:10 to 1:0.1, at least a part of the hydroxyl groups bounded to aliphatic structures of the Mannich base (A) or of the epoxy resin (B) have been converted to urethane groups by reaction with a partially blocked polyisocyanate.

2. A surface-coating binder as set forth in claim 1, wherein the Mannich base is obtained from a phenol of the formula

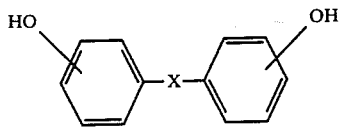

(I)

where the hydroxyl groups are in the ortho position or para position to X and where X is a straight-chain or branched chain divalent aliphatic radical of 1 to 3 carbon atoms or is $SO_2$, SO, O or $CH_2-NR-CH_2$ (where R is alkyl of 1 to 6 carbon atoms) as component (a₁).

3. A surface-coating binder as set forth in claim 1, wherein the Mannich base is obtained from bisphenol A as component (a₁).

4. A surface-coating binder as set forth in claim 1, wherein the component (a₂) is obtained from a reaction product of a diglycidyl ether of bisphenol A or a dihydric to tetrahydric aliphatic alcohol with bisphenol A and optionally with phenol.

5. A surface-coating binder as set forth in claim 1, wherein the Mannich base is obtained from components (a₁) and (a₂) employed in a weight ratio of from 1:0.1 to 1:5.

6. A surface-coating binder as set forth in claim 1, wherein the Mannich base is obtained from diethanolamine as component (b₁).

7. A surface-coating binder as set forth in claim 1, wherein the Mannich base is obtained from di-n-butylamine as component (b₂).

8. A surface-coating binder as set forth in claim 1, wherein the Mannich base is obtained from the components (a₁+a₂) and (b₁+b₂) employed in a molar ratio (a₁+a₂):(b₁+b₂) of from 1:0.75 to 1:3, and an amount of component (c) of at least 1 mole per 1 mole of (b).

9. A surface-coating binder as set forth in claim 1, wherein a reaction product of a polyhydric phenol of the formula

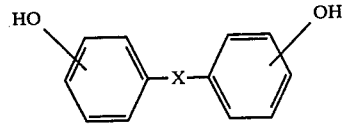

where X has the meaning given in claim 2, with epichlorohydrin, is used as component B).

10. A surface-coating binder as set forth in claim 23, wherein component (B) is a reaction product of bisphenol A or pentaerythritol with epichlorohydrin.

11. A surface-coating binder as set forth in claim 1, wherein the reaction of component (A) with component (B) is carried out under conditions where from 0.2 to 0.9 epoxide group of component (B) is present per phenolic hydroxyl group of component (A).

12. A surface-coating binder as set forth in claim 1, wherein the aliphatic hydroxyl groups of the epoxide resin (B) have been reacted with a partially blocked polyisocyanate, at such a ratio between the amounts used that from 0.01 to 1.0 mole of urethane groups are present per mole of basic nitrogen in the finished binder.

13. A surface-coating binder as set forth in claim 1, wherein an aromatic diisocyanate blocked with an aliphatic alcohol has been used as partially blocked polyisocyanate.

14. A surface-coating binder as set forth in claim 1, wherein the partially blocked polyisocyanate is a toluylene diisocyanate which is blocked with one mole of an aliphatic monoalcohol of 2 to 8 carbon atoms.

15. A surface coating binder as set forth in claim 1, wherein a reaction product of a dihydric to tetrahydric aliphatic alcohol with epichlorohydrin is used as component (B).

16. A surface coating binder as set forth in claim 1, wherein the aliphatic hydroxyl groups of component ($a_2$) of the Mannich base (A) have been reacted with a partially blocked polyisocyanate, at such ratio between the amounts used that from 0.01 to 1.0 mole of urethane groups are present per mole of basic nitrogen in the finished binder.

17. A process as set forth in claim 4, wherein the reaction products have molecular weights of from 650 to 1300 and where any excess of epoxide groups has been eliminated.

18. A surface-coating binder as set forth in claim 1, wherein the urethane groups are formed by reaction with from 3 to 15%, based on solids, of partially blocked polyisocyanate.

* * * * *